(12) United States Patent
Reents et al.

(10) Patent No.: US 7,281,935 B2
(45) Date of Patent: *Oct. 16, 2007

(54) CONNECTOR FOR MODULAR ELECTRONIC STORAGE UNIT

(75) Inventors: Jeffrey M. Reents, Carnation, WA (US); Prakash R. Stirret, Bellevue, WA (US)

(73) Assignee: Microsoft Corporation, Remond, WA (US)

( * ) Notice: Subject to any disclaimer, the term of this patent is extended or adjusted under 35 U.S.C. 154(b) by 125 days.

This patent is subject to a terminal disclaimer.

(21) Appl. No.: 11/328,233

(22) Filed: Jan. 10, 2006

(65) Prior Publication Data

US 2006/0158834 A1    Jul. 20, 2006

Related U.S. Application Data

(63) Continuation-in-part of application No. 11/026,529, filed on Dec. 30, 2004.

(51) Int. Cl.
    *H01R 13/64* (2006.01)
(52) U.S. Cl. .................. 439/248; 200/50.12; 439/247; 439/378
(58) Field of Classification Search ........ 439/247–248, 439/911, 378, 680, 559, 341, 535; 200/50.12; 361/616, 641, 724, 679; 340/693.9
See application file for complete search history.

(56) References Cited

U.S. PATENT DOCUMENTS

| | | | | |
|---|---|---|---|---|
| 3,335,238 A | * | 8/1967 | Zavertnik et al. | 200/50.06 |
| 4,091,246 A | * | 5/1978 | Donofrio et al. | 200/50.28 |
| 4,612,424 A | * | 9/1986 | Clark et al. | 200/50.18 |
| 4,703,147 A | * | 10/1987 | Happ et al. | 219/722 |
| 4,853,807 A | * | 8/1989 | Trager | 360/97.01 |
| 5,253,133 A | * | 10/1993 | Guo | 360/97.01 |
| 5,397,244 A | * | 3/1995 | Generoli et al. | 439/248 |
| 5,610,376 A | * | 3/1997 | Takagi et al. | 200/50.01 |
| 7,074,084 B2 | * | 7/2006 | Shuey et al. | 439/607 |

* cited by examiner

*Primary Examiner*—Michael C. Zarroli
(74) *Attorney, Agent, or Firm*—Banner & Witcoff, Ltd.

(57) ABSTRACT

An electronic storage unit, which may contain a hard disk drive, is configured to removably mount to a recessed surface of a console. The housing includes a lip and a biased latch arm so that the lip can be inserted into a corresponding feature in the recessed surface and the electronic storage unit can be rotatably mounted to the recessed surface. A cable connector extends from the bottom of the electronic storage unit and is configured to connect to a receptor on the console when the electronic storage unit is installed. The cable connector is configured with asymmetrical guideposts to aid in aligning the electronic storage unit for rotational insertion into the console. The electronic storage unit can be readily removed from the console.

20 Claims, 14 Drawing Sheets

CONNECTOR FOR MODULAR ELECTRONIC STORAGE UNIT

CROSS REFERENCE TO RELATED APPLICATIONS

This application is a continuation-in-part of pending U.S. application Ser. No. 11/026,529, filed Dec. 30, 2004, entitled "Removable Module for a Console," whose contents are expressly incorporated by reference.

BACKGROUND

Consoles for playing video games and reproducing media such as movies have increasing become a part of home entertainment. Initial consoles, while enjoyable, were somewhat limited in processing power and graphical capabilities. Over time, however, consoles have significantly increased in power and capabilities and now provide significant levels of immersive entertainment. Thus, like home computers, individuals have come to expect to purchase a console for use in home entertainment.

Home entertainment, it should be noted, encompasses more than playing video games. Home entertainment includes the ability to play movies and music and to provide other capabilities as dictated by software. Thus, a console can provide significant home entertainment value.

Consoles, while sharing certain similarities with home computers, are unique because of the environment in which they work. Modern consoles have powerful processors and sophisticated video and sound reproduction capabilities. Consoles can be used to reproduce movies and music in addition to playing games that are highly immersive. Consoles, however, like other powerful computers, generate significant amounts of heat that typically must be removed by the use of heat transfer system such as one or more fans that creates an air flow suitable for transfer of the heat via convection. Therefore, sound generation is a significant issue for consoles because background noise generated by fans is undesirable. Thus, while a processor in a console still generates heat, the heat must be handled in a more elegant fashion than is typical for most home computers.

Part of the reason for the need for a more elegant design is that consoles tend to be packaged in smaller housing than most home computers. Thus, unlike a typical computer packaged in a tower case, the console, while containing many similar components, is packaged in a relatively compact space. Often there is little or no extra space within the console. Accordingly, upgrades to a console are more challenging than upgrades to a home computer.

SUMMARY

A console is configured to include an outer housing that provides a relatively slim and attractive profile. The outer housing has a number of sides, including a front side, a left side and a right side. A panel on a side of the console is removable and covers a recessed surface and a cable receptor. A hard disk drive ("HDD") is provided in a HDD module that is configured to removably mount in the recessed surface so that a cable connector extending from the HDD module mates with the cable receptor during installation. A portion of the HDD module extends beyond the recessed surface so as to modify the profile of the console when the HDD module is installed. Thus, a user can purchase a console without a HDD and later purchase a HDD upgrade that is readily installed by the user and the HHD upgrade can provide visual clues that the console has been upgraded.

The cable connector includes two asymmetrical guideposts to aid in alignment of the cable connector with the cable receptor. The guideposts allow rotational insertion of the cable connector into the cable receptor.

BRIEF DESCRIPTION OF THE DRAWINGS

The present invention is illustrated by way of example and not limited in the accompanying figures in which like reference numerals indicate similar elements and in which.

DETAILED DESCRIPTION

A console can be configured to be sold with our without a modular electronic storage unit, such as a hard disk drive ("HDD") module. If sold without the HDD module, a cover panel is provided to cover a recessed surface on an end of the console. When the individual desires, the cover panel may be removed and the module may be installed.

Figure 1:
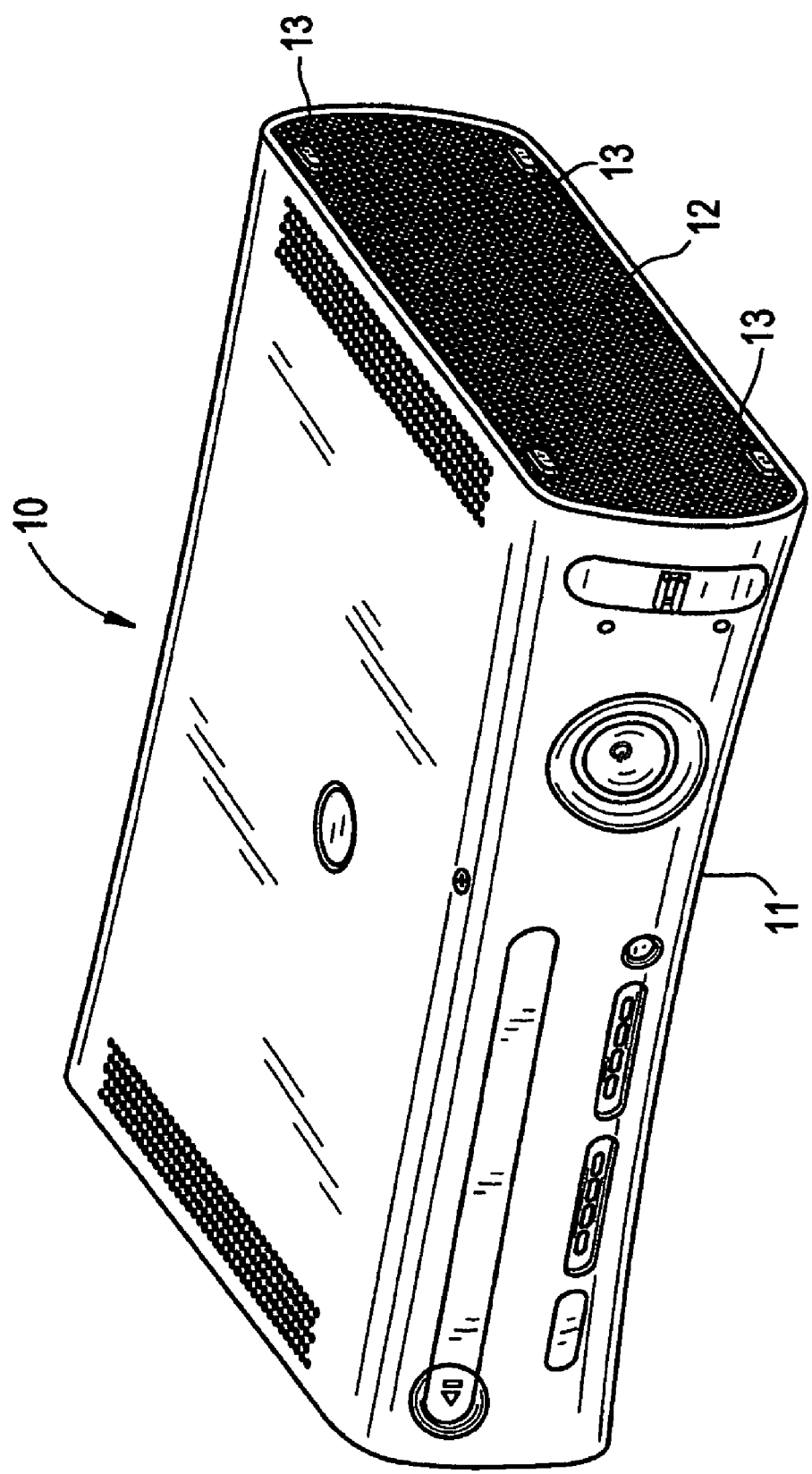
FIG. 1 illustrates an isometric view of an embodiment of a console.

Turning to FIG. 1, an isometric view of a console 10 is provided. As depicted, console 10 includes a body 11 and a first end 12. The first end 12 includes four support extensions 13 configured to support the console 10 when the console 10 is stood on its side. Another end of the console 10 can be similarly configured with support extensions. However, to provide flexible orientation it is only beneficial to include support extensions on one end in addition to including support extensions on a bottom. Of course, extensions are not required but eliminating extension makes it more difficult for air to pass through the surface supporting the console 10.

Given the relatively slim profile of the console 10, it is likely that console 10 can readily fit adjacent a display, such as a TV or a monitor. The ability to stand the console 10 on its side also provides additional flexibility for positioning the console 10 in a desirable and attractive manner.

Figure 2:
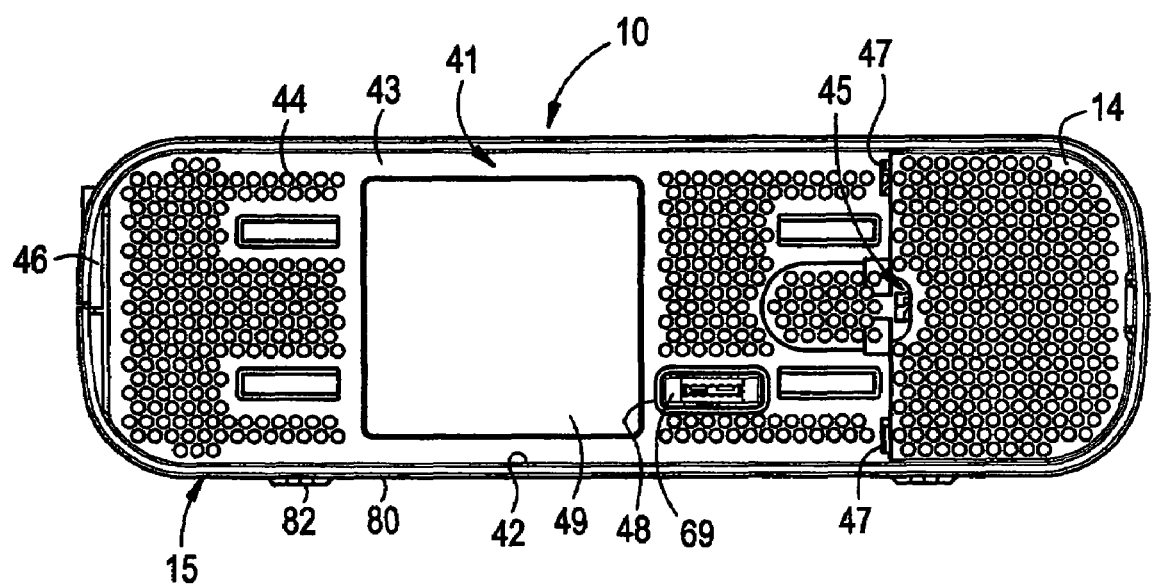
FIG. 2 illustrates a plan view of an embodiment of recessed surface of a console.

Turning to FIG. 2, a view of an embodiment of a second end 15 of console 10 is provided with an opening shown, thus the cover panel 82 is not installed. Accordingly, an upgrade module could be installed in the opening or recessed surface. As depicted, a surface 14 is provided and surface 14 ends where a recessed surface 41 starts. Recessed surface 41 is defined by a perimeter wall 42 and a recessed floor 43. A label 49 can be mounted on recessed floor 43 and a plurality of holes 44 can be provided in recessed floor 43, the holes 44 defining air passageways so that air can enter the interior portion of the console 10 through the recessed floor 43.

Recessed surface 41 also includes a latch retainer 45, a lip 46 and two latch arm retainers 47. The latch retainer 45 and the lip 46 are configured to hold a cover panel 82 (not shown) in place so that the cover panel 82 does not become inadvertently removed during normal usage of the console 10. The recessed floor 43 further includes a receptor hole 48 that is configured to provide a passageway through recessed floor 43 so as to allow access to the cable receptor 69.

As noted above, the second end of console 10 includes a surface 14 that is not recessed like the recessed floor 42. Thus, the console 10 is configured so that when the cover panel 82 is installed, the outer surface of cover panel 82 is substantially flush with surface 14 so that the second end 15 looks like a relatively continuous surface. The intersecting line along which the cover panel 82 and the surface 14 join may be visible.

Figure 3:
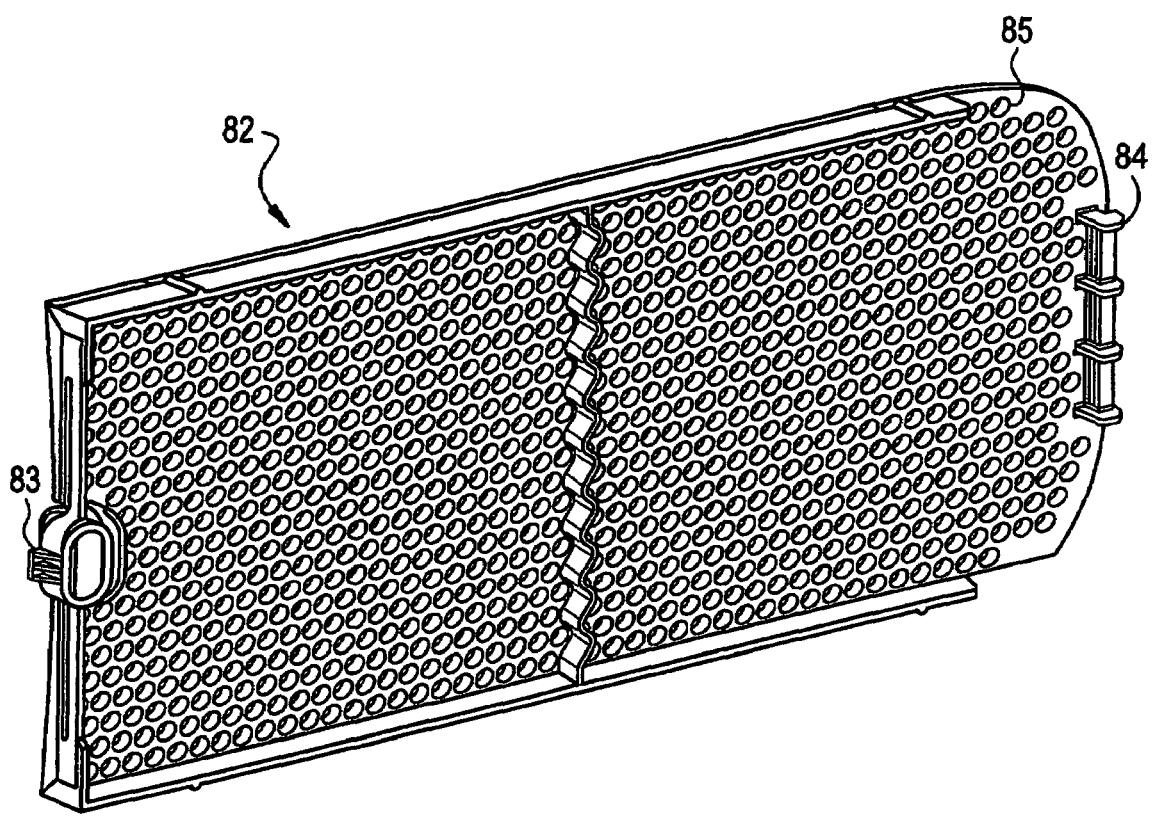
FIG. 3 illustrates an isometric view of a door configured to install in the recessed surface depicted in FIG. 2.

Turning next to FIG. 3, a rear isometric view of the cover panel 82 is depicted. As noted above, Cover panel 82 is configured to mate with the recessed surface 41 of the console 10. In an alternative arrangement, not shown, the location of recessed surface 41 could be located on another side of the console 10 provided other components of console 10 were appropriately arranged.

Cover panel 82 includes a button latch 83, a tongue 84, and a plurality of holes 85 that define air passageways through the cover panel 82. To install cover panel 82 into recessed surface 41, the tongue 84 is placed under the lip 46 and the button latch 83 of Cover panel 82 is inserted into the latch retainer 45. To uninstall the cover panel 82, the latch 84 is depressed in an inward direction and the cover panel 82 can be removed.

Figure 4:
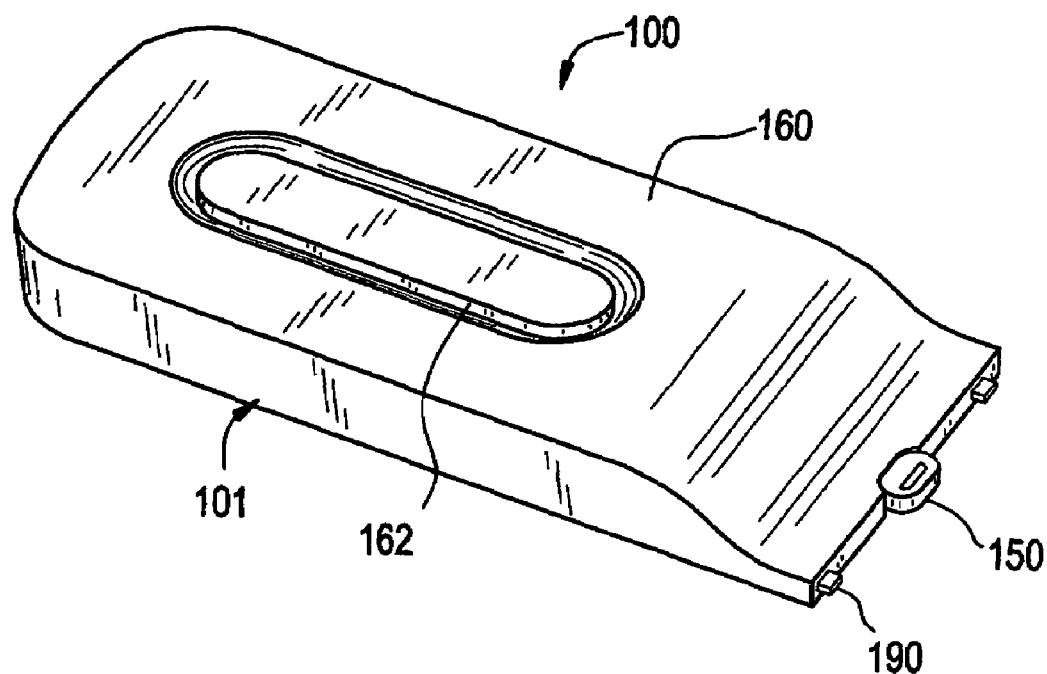
FIG. 4 illustrates an isometric top view of an embodiment of a module configured to be installed in the recessed surface depicted in FIG. 2.

Turning to FIG. 4, an isometric view of a HDD module 100 is provided. HDD module 100 includes a housing 101 that has a top surface 160. A vent 162 can be provided in top surface 160 so as to allow air to enter housing 101. The shape of the vent 162 is not important as long as air can be allowed to enter through the display surface 112, thus the shape of vent 162 could be more circular, could be square, or could be any number of other shapes such as one or more lines. The HDD module includes a latch 150 and latch arms 190, the function of which will be discussed in greater detail below.

Figure 5:
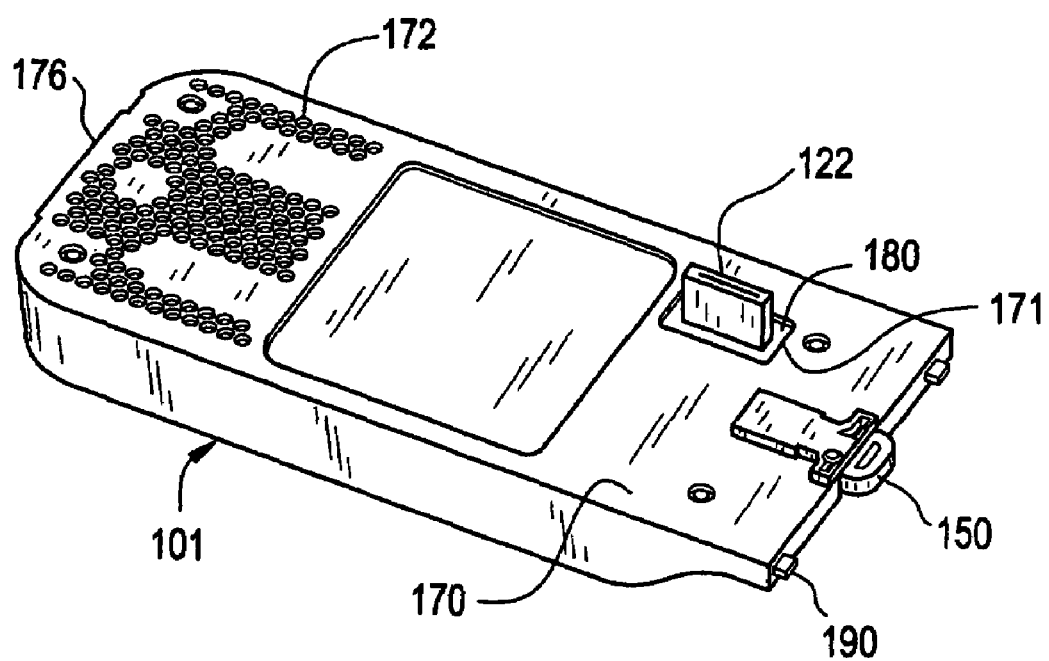
FIG. 5 illustrates an isometric bottom view of an embodiment of a module configured to be installed in the recessed surface depicted in FIG. 2.

FIG. 5 depicts the HDD module 100 of FIG. 4 with the bottom surface 170 visible. A tongue 176 is provided opposite the latch 150 and the latch arms 190 and is configured to cooperate with the latch arms 190 to hold the HDD module 100 in the installed or mounted position in a manner similar to tongue 84. The bottom surface 170 includes a connector hole 171 through which a cable connector 122 extends from the housing 101, the cable connector 122 being sealed to the connector hole 171 by seal 180. A plurality of air holes 172 are also provided on the bottom surface 170, the plurality of air holes 172 configured to define passageways for allowing air to pass through the bottom surface 170 and into the console 10 when the HDD module 100 is installed.

It should be noted that the air pressure of the interior of the console 10 can be lowered by a fan system (not shown) that directs air out of the console 10, thus air would tend to enter the console 10 through other openings provided in the console 10. Therefore, some of the passageways defined by the holes 44 in recessed floor 43 are configured to correspond to the passageways that are defined by holes 172 in the bottom surface 170. In this manner, air can flow through the HDD module 100 and help cool the HDD module 100 but, as the air temperature of the air that passes through the HDD module 100 will typically be cooler than the heat sink mounted to the processor inside the console 10, the air that enters the console 10 through the HDD module 100 will still be useful in transferring heat away from the heat sink.

Figure 6:
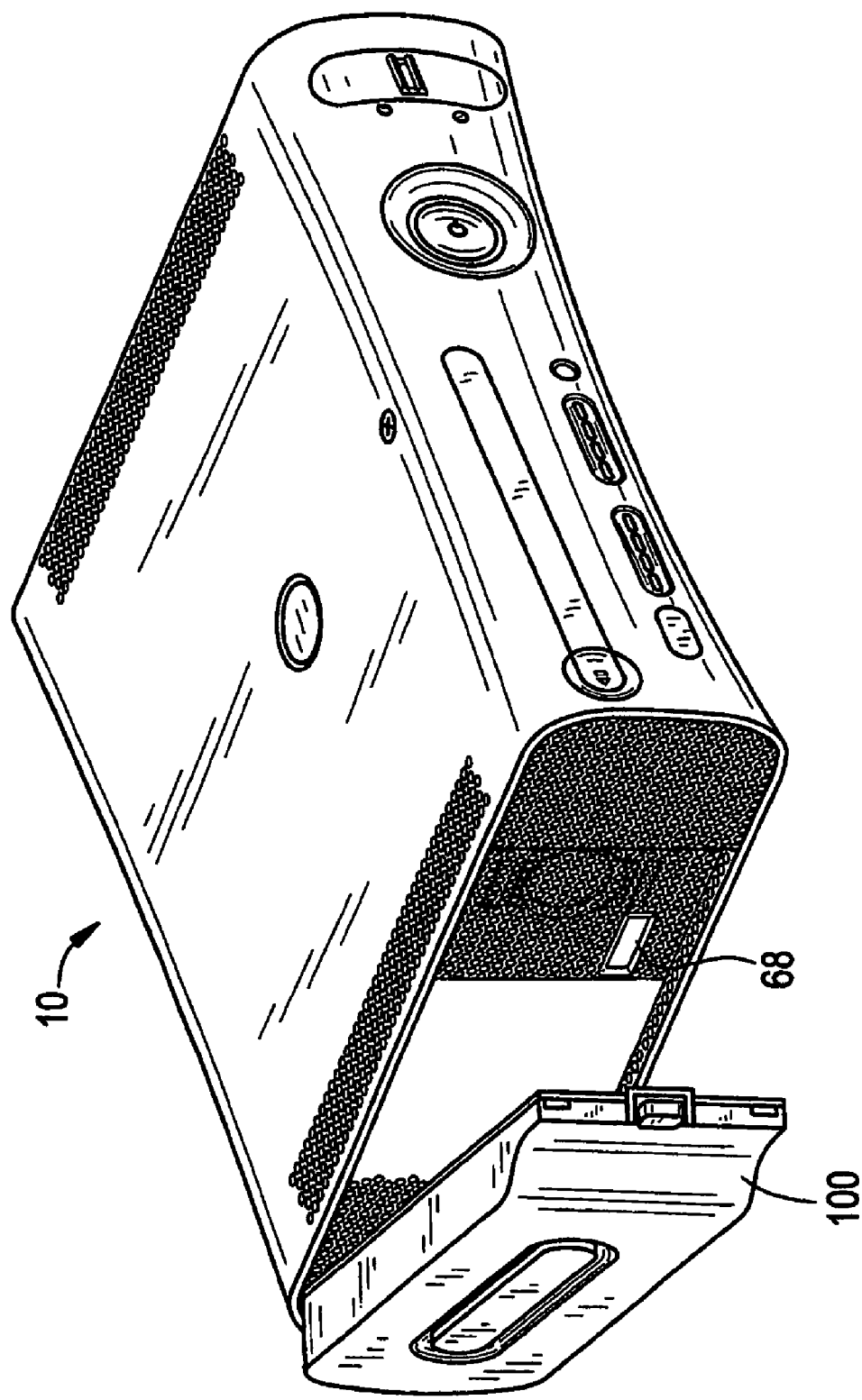
FIG. 6 illustrates an isometric view of an embodiment of a module being installed in the recessed surface depicted in FIG. 2.

FIG. 6 depicts the installation process of the HDD module 100. First the tongue 176, not visible, is inserted under the lip 46. The HDD module 100 is then rotated around so that the latch arms 190 engage latch arm retainers 47. As depicted, the cable receptor 69 can be covered by a door 68 that pivots out of the way when the HDD module 100 is installed. In an alternative embodiment, door 68 can be replaced with a plug that can be removed prior to installing the HDD module 100.

Figure 7:
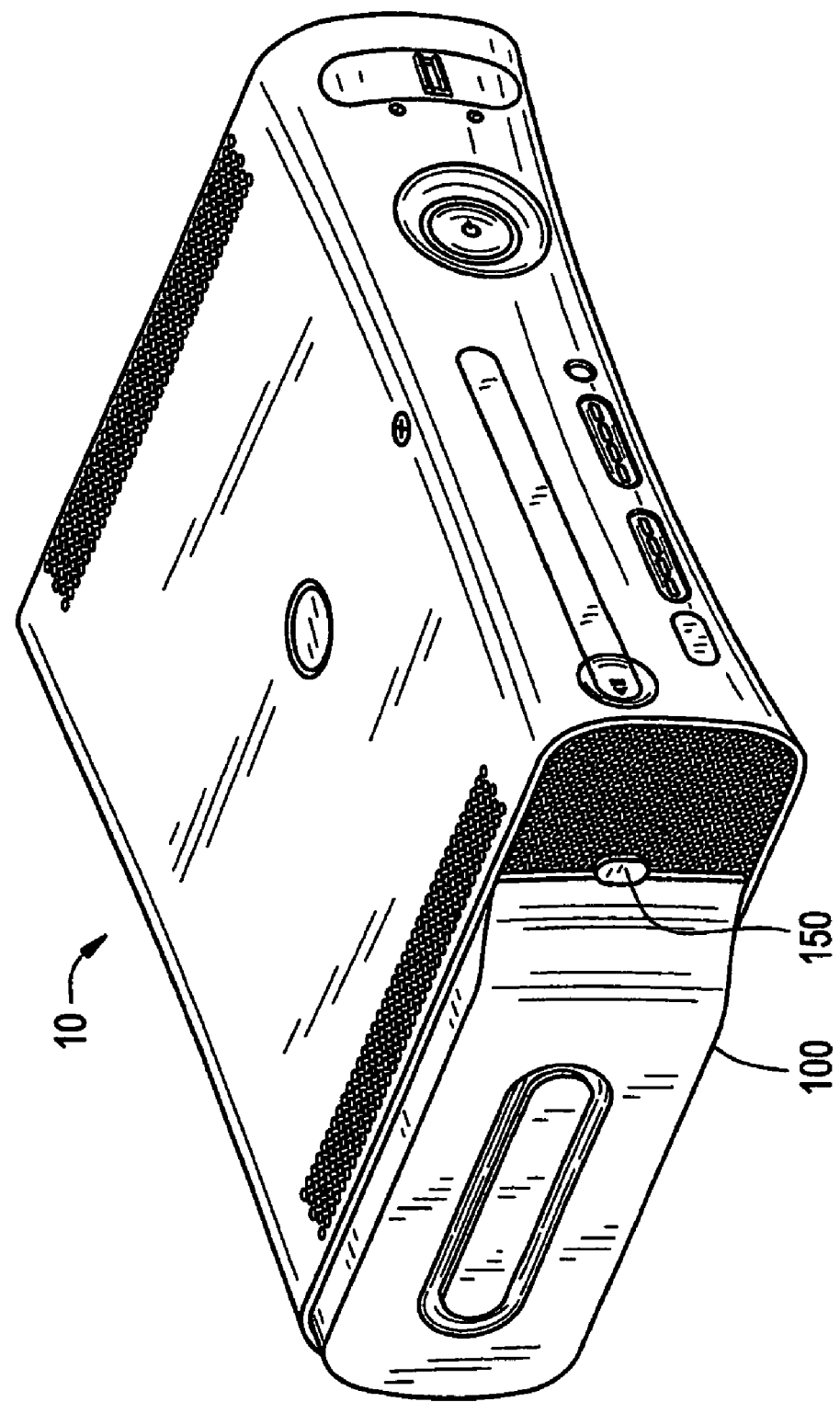
FIG. 7 illustrates an isometric view of the module and console depicted in FIG. 6 with the module in an installed state.

FIG. 7 depicts the HDD module 100 in the installed position. The latch 150 is visible and can be depressed and when the latch 50 is depressed the HDD module 100 can be removed. Thus, the HDD module 100 is removably mounted to the console 10.

As depicted, the bottom surface 160 of HDD module 100 is in contact with the recessed floor 43. Thus, a portion of the HDD module 100 is within the recessed surface 41 formed by the wall 42 and the recessed floor 43. However, it is also apparent that a portion of the HDD module 100 extends beyond the wall 42. Thus, when installed, the HDD module 100 alters the profile of the console 10. This allows individual to quickly recognize that the console 10 has been upgraded. The external shape of the HDD module 100 is not crucial and any one of many alternative configurations may be used. It is desirable, however, that a difference in the external shape of console 10 be readily recognized once the HDD module 100 is installed.

In such an embodiment, an individual could instantly recognize that the console has been upgraded. It would also be desirable to enhance the look of the console with the addition of the upgrade. Such a configuration would make the upgrade desirable from both a stylistic view point and a capabilities view point, thus providing substantial value to a wider range of individuals such that many individual will decide the value of the upgrade is greater than the cost of the upgrade.

Figure 8:
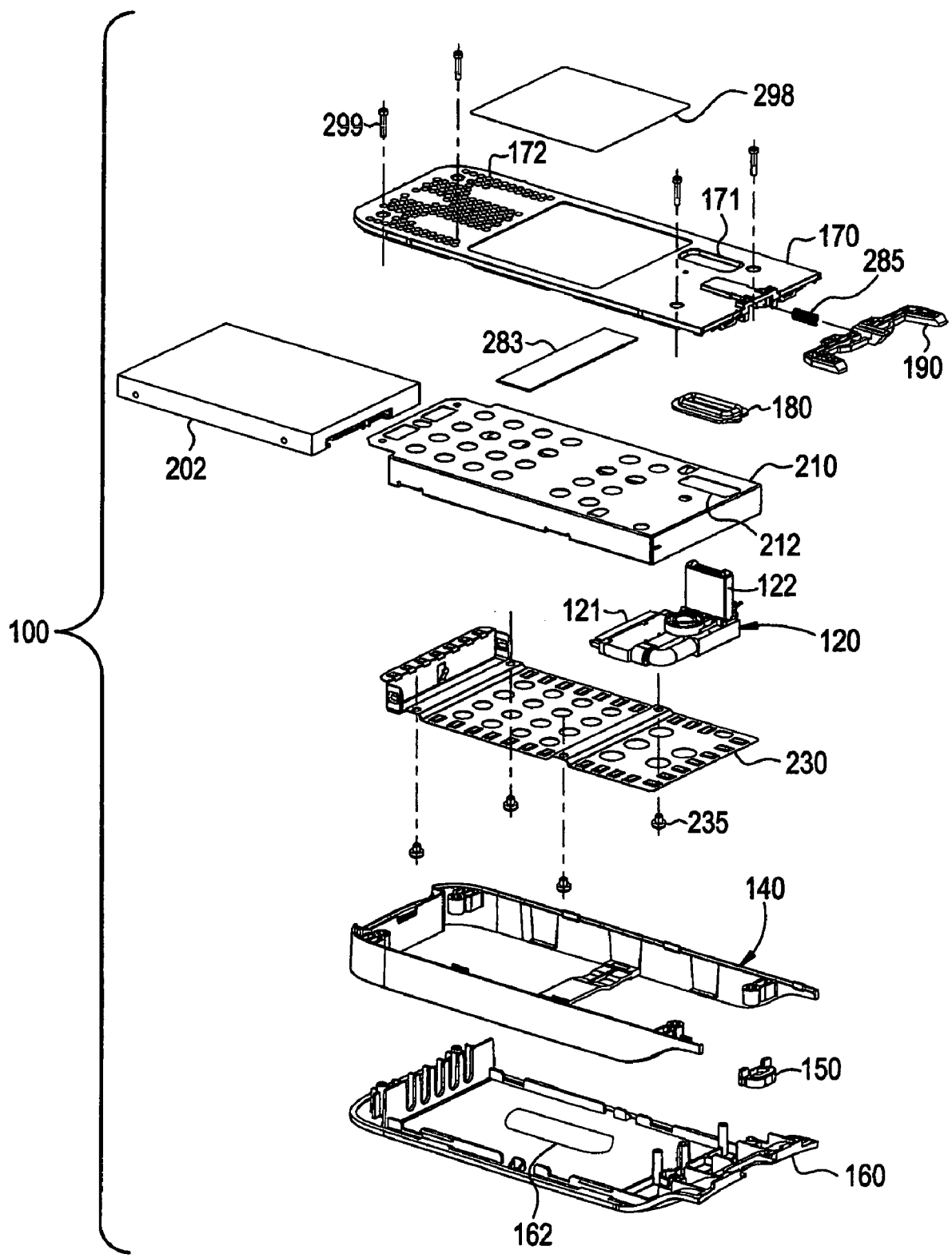
FIG. 8 illustrates an exploded view of an embodiment of a hard disk drive module.

Turning now to FIG. 8, an exploded view of an embodiment of a HDD module 100 is depicted. The HDD module 100 includes HDD 202 that is supported by frame 210. HDD 202 can be sized according to the requirements of the console and the purpose of the HDD module 100. Thus, the HDD 202 could be sized to provide 20, 40, 60, 80, 100 or more gigabytes of storage. Naturally, other sizes are possible as HDD are now available with 400 gigabytes of storage. Preferably the HDD is configured to provide rapid access to the information stored on the HDD 202, therefore a 7200 RPM based HDD may be preferable.

The frame 210, in addition to supporting the HDD 202, also supports a cable assembly 120. A HDD cable connector 121 connects the cable assembly 120 to the HDD 202 and the cable connector 122 extends through a passageway in the frame 210 that is defined by hole 212. Preferably the connector is configured to allow rapid transfer of memory between the HDD 202 and is further configured to provide power to the HDD 202. In an embodiment, the cable and the connectors are based on a modified Serial ATA format.

To aid in supporting the HDD 202 and the cable assembly 120 and the cable connector 122, a midframe 230 is mounted to the frame 210 by a plurality of fasteners 235 so that the HDD 202 and the cable assembly 220 are sandwiched between the frame 210 and the midframe 230. Naturally, other configurations of supporting the HDD 202 and the cable assembly 220 are possible.

A housing frame 140, a top surface 160 and a bottom surface 170 are configured to support the HDD 202 and the cable connector 122 by supporting the frame 210 and the midframe 230. Top surface 160 can include one or more vents 162 that allow air to pass through the housing top so as to provide cooling to the HDD 202. While depicted as an edge in the shape of an elongated hole, the vent 162 can be a variety of shapes and configurations. Thus, the beneficial part about providing the vent 162 is the ability to improve air flow through the HDD module 100.

It is possible to eliminate the frame 210 or the mid frame 230 and support the HDD 202 directly by the housing frame 140, the top surface 160, and the bottom surface 170 but some of the vibration protection is lost when the frames are eliminated. Further, the frame 210 and the midframe 230 provide EMI grounding that typically is highly desirable when packaging the HDD 202. The frame 210 and midframe 230 may be made of any suitable metal material, such as steel or, more particularly, cold rolled steel.

Top surface 160 and bottom surface 170 mount to housing frame 140 and the combination of the housing frame 140, the top surface 160 and the bottom surface 170 form a housing 101 for the HDD module 100. Thus, the outer surface of top surface 160 is a display surface and the outer surface of bottom surface 170 is a mounting surface. Bottom surface 170 includes a connector hole 171 that defines a passageway through the bottom surface 170, the connector hole 171 configured to correspond to the cable connector 122. To aid in sealing the cable connector 122 to the bottom surface 170, a seal 180 is located between the frame 210 and the bottom surface 170, the seal 180 aligned with connector hole 171. As depicted, bottom surface 170 also includes a plurality of air holes 172 that define passageways in the housing bottom so that air can flow through the bottom surface 170.

In addition to sealing the cable connector 122 to the bottom surface 170, the seal 180 aids in positioning the cable connector 122 for proper insertion into the cable receptor 69. The flexible seal 180 allows movement of the cable connector within connector hole 171 in the bottom surface 170. The seal 180 surrounds the cable connector 122 thereby allowing movement laterally or radially, throughout all 360° of motion available. The flexible seal 180 also allows movement downward, toward the bottom surface 170. The flexible seal may be made from an elastomeric material.

The varied directions of potential movement provided by the flexible seal 180 aid in positioning the cable connector 122 for insertion into the cable receptor 69. The flexible seal 180 provides a biasing force on the cable connector 122. This biasing force urges the cable connector 122 to a central region. Upon insertion, the cable connector 122 maintains its position in this central region due to the biasing force, until forced toward an alternate position. The flexible seal 180 then allows movement of the cable connector 122 until the proper orientation is established for insertion into the cable receptor 69.

The flexible seal 180 may also damped any outside forces on the HDD. For instance, in a shock event, such as when the HDD is dropped from any height, the seal 180 will absorb some of the force of the shock event. This will aid in protecting the HDD from damage and in extending its useful life.

Pad 283 is also located between the frame 210 and the bottom surface 170 and can provide vibration dampening. In an embodiment, pad 283 is made of double sided sticky tape and aids in the installation process.

To aid in holding the HDD module 100 in position, a latch 150 is configured to cooperate with a biasing element 285 (e.g. a coil spring) and a latch arm 190. Label 298 can be installed on bottom surface 170. Once the components are properly positioned, a plurality of fasteners 299 are used to hold the bottom surface 170, the housing frame 140, and the top surface 160 together. The HDD module 100 is than ready to be installed on the console.

Figure 9:
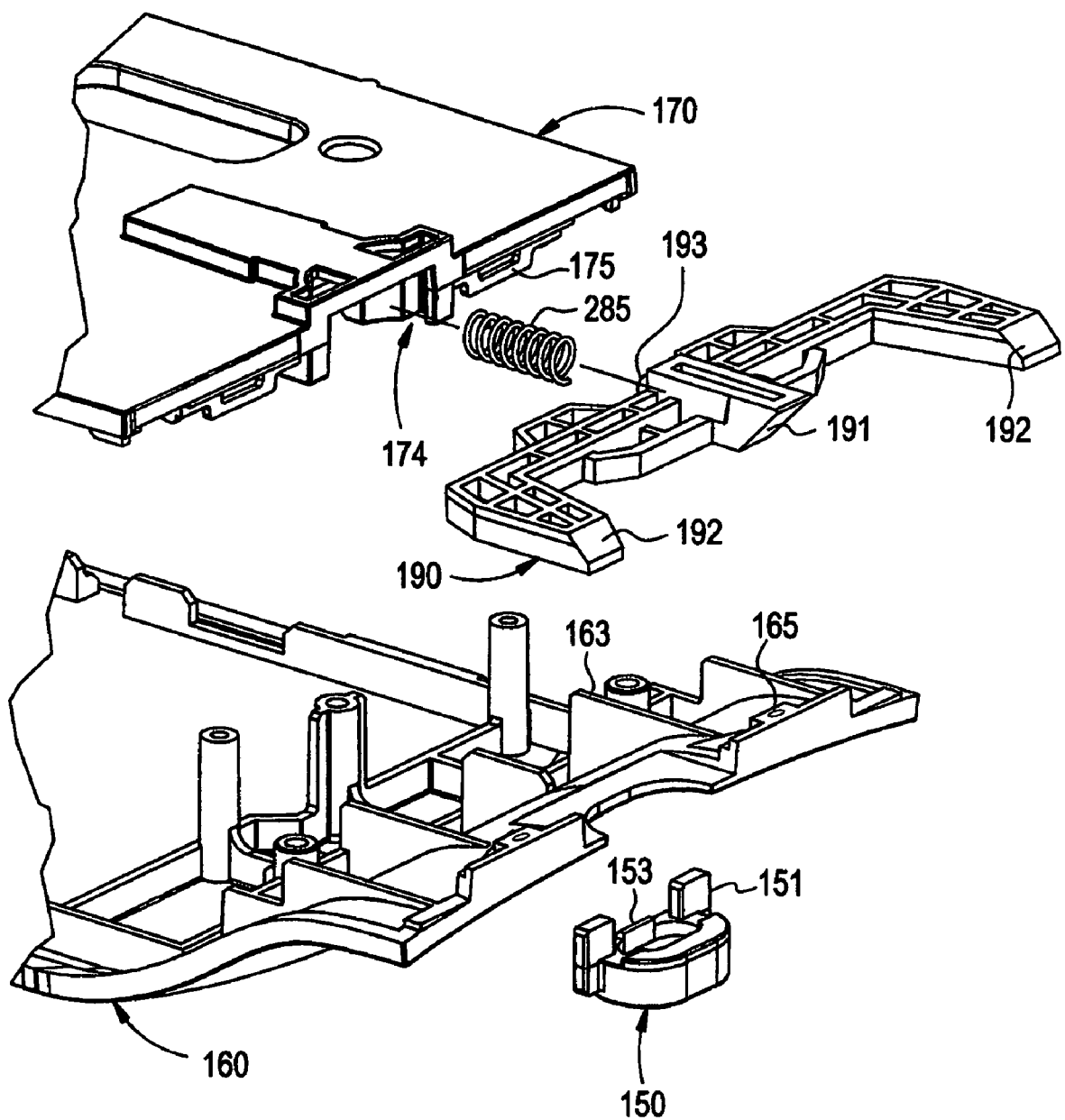
FIG. 9 illustrates a partial exploded close-up view of some of the components depicted in FIG. 8.
Figure 10:
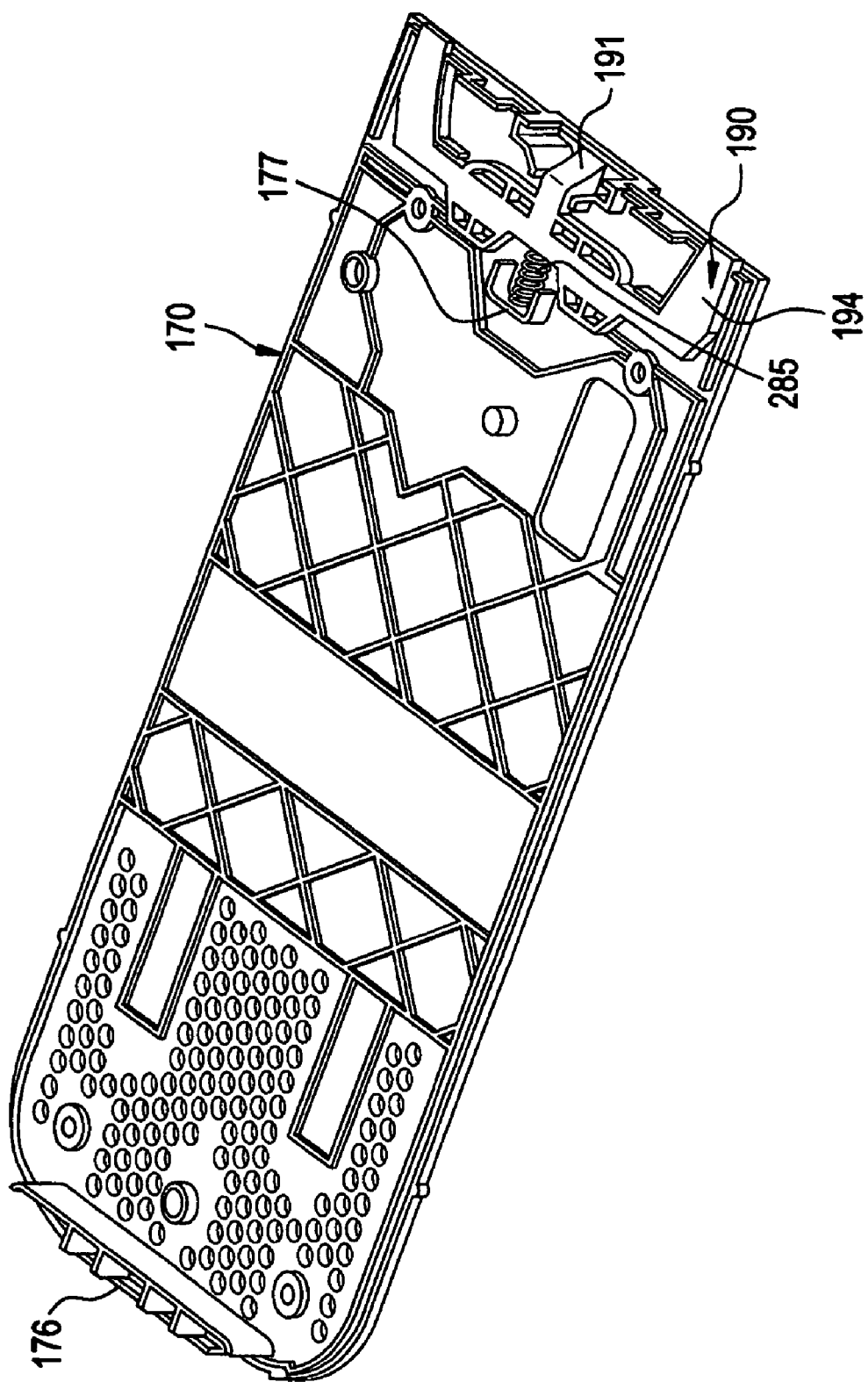
FIG. 10 illustrates an isometric view of several of the components depicted in FIG. 9 with the components assembled.

Turning to FIGS. 9 and 10, an embodiment of the components that allow the HDD module 100 to be installed is depicted. As previously discussed, a tongue 176 of the bottom surface 170 is inserted in a corresponding lip 46 in the recessed surface 41 of the console 10. Once so inserted, the HDD module 100 can be rotated into position. To hold the HDD module 100 in place, the latch arm 190 is mounted between the top surface 160 and the bottom surface 170. Preferably at least one support edge 163 is provided on top surface 160 to help hold the latch arm 190 in position, however, as depicted a plurality of support edges 163 are provided. The use of multiple thin support edges 163 properly supports the latch arm 190 while helping to reduce friction so that the latch arm 190 can readily translate.

Latch arm 190 includes a latch ramp 191, latch sliding surfaces 192 and latch biasing receptor 193. Referring now to FIG. 10, the latch arm 190 is shown installed on bottom surface 170. The bottom surface 170 includes a biasing support 177 and the biasing element 285 (shown as a coiled spring) is positioned between the latch biasing receptor 193 and the biasing support 177. Thus, the biasing element 285 directs the latch arm 190 forward so that latch sliding surfaces 192 extend from the housing 101.

Referring back to FIG. 9, the latch 150 includes arms 151 that engage channels 174 in the bottom surface 170. The latch 150 further includes a translation surface 153 configured to interface with latch ramp 191. Thus, when the arms 151 of latch 150 are installed in the channels 174, the latch ramp 191 rests against the translation surface 153 of latch 150. The force exerted on latch arm 190 by biasing element 285 forces the latch to be in closed or first position. When a force is exerted on the latch 150 that overcomes the force provided by the biasing element 285, however, the latch arm 190 is translated in a rearward direction.

A force exerted on the latch sliding surfaces 192 can also cause the latch arm 190 to translate in a rearward direction. Given the angle of the latch sliding surface 192, a force exerted orthogonal to the plane of translation will still cause the latch arm 190 to translate. Thus, when the HDD module 100 is inserted, pressing the latch sliding surfaces 192 against the latch arm retainers 47 will cause the latch arm 190 to translate until the HDD module 100 is fully inserted into the recessed surface 41. Once inserted, however, the latch arm 190 will be directed forward by the force exerted on the latch arm 190 by the biasing element 285 and the latch arm 190 will extend under the latch arm retainers 47 to latch the HDD module 100 to the console 10.

As depicted, the top surface 160 can include a connecting feature 165 the interfaces with mating connecting feature 175 so that the two connecting features help to hold the top surface 160 and the bottom surface 170 together.

As can be observed in FIG. 10, the mounting side 194 of latch arm 190 is relatively flat. Thus, once mounted to the console 10, the latch arm 190 will tend to hold the HDD module 100 in position until the latch 150 is displaced. In this manner, the HDD module can be readily installed on a console 10 and just as readily be removed. Such a feature allows for individuals to move a HDD module from one console to another, thus information on a HDD module 100 can be translated without the need to translate the entire console. Thus, an individual could remove a HDD module containing high scores, user profiles and saved games (as most games are driven by either a CD or a DVD, the hard drive typically would not include an actual game) and install the HDD module on a friend's console so that both individuals could take advantage of the saved data. In this manner, an individual could travel with personalized data without the need to carry the console itself.

Figure 11:
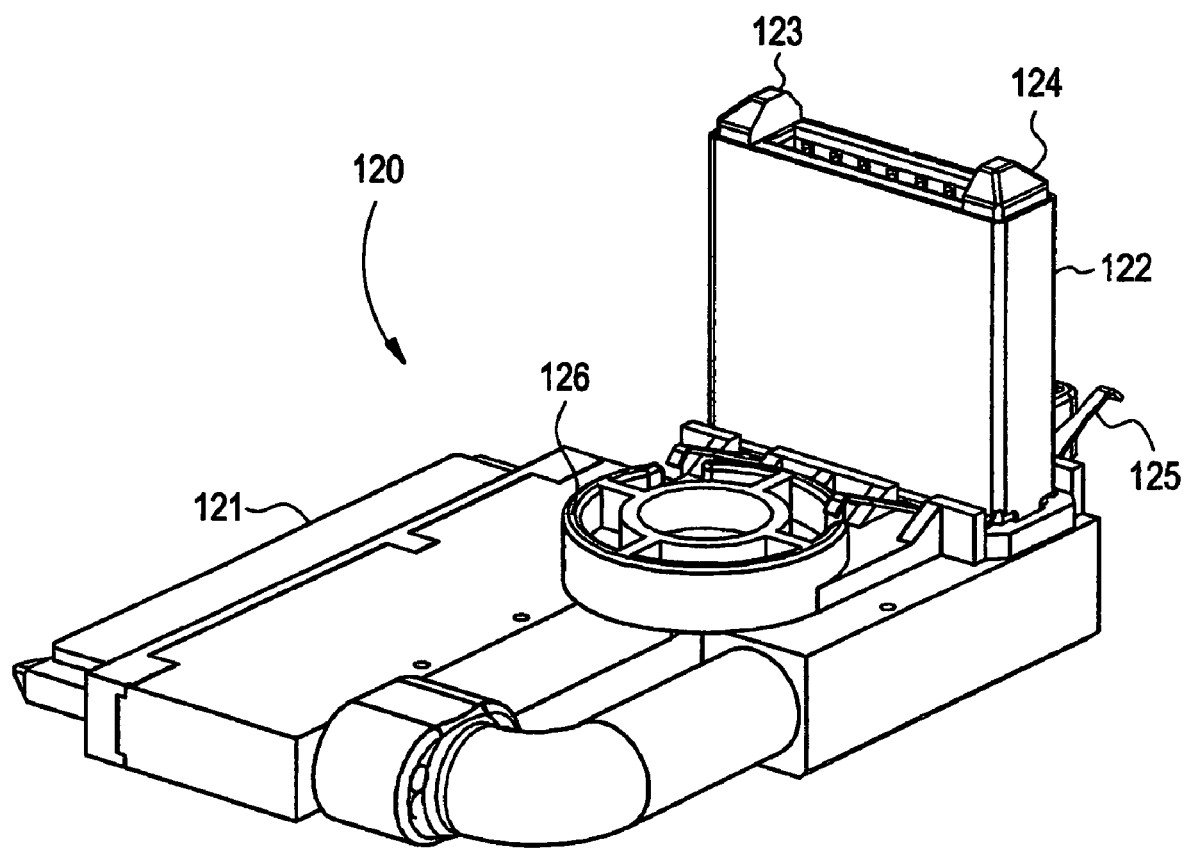
FIG. 11 illustrates an isometric view of an embodiment of a cable assembly.

Turning to FIG. 11, an embodiment of the cable assembly 120 is depicted. The cable connector 121 is electrically connected to cable connector 122. As noted above, the HDD module 100 is preferably not inserted in a straight line but is rather rotated into position. Thus, the cable connector 122 preferably should allow for insertion into the cable receptor 69 without requiring perfect alignment. As depicted, post 123 and post 124 have angled surfaces that aid in allowing the cable connector 122 to be inserted into the cable receptor 69. Posts 123 and 124 are shown in detail in FIG. 12.

Figure 12:
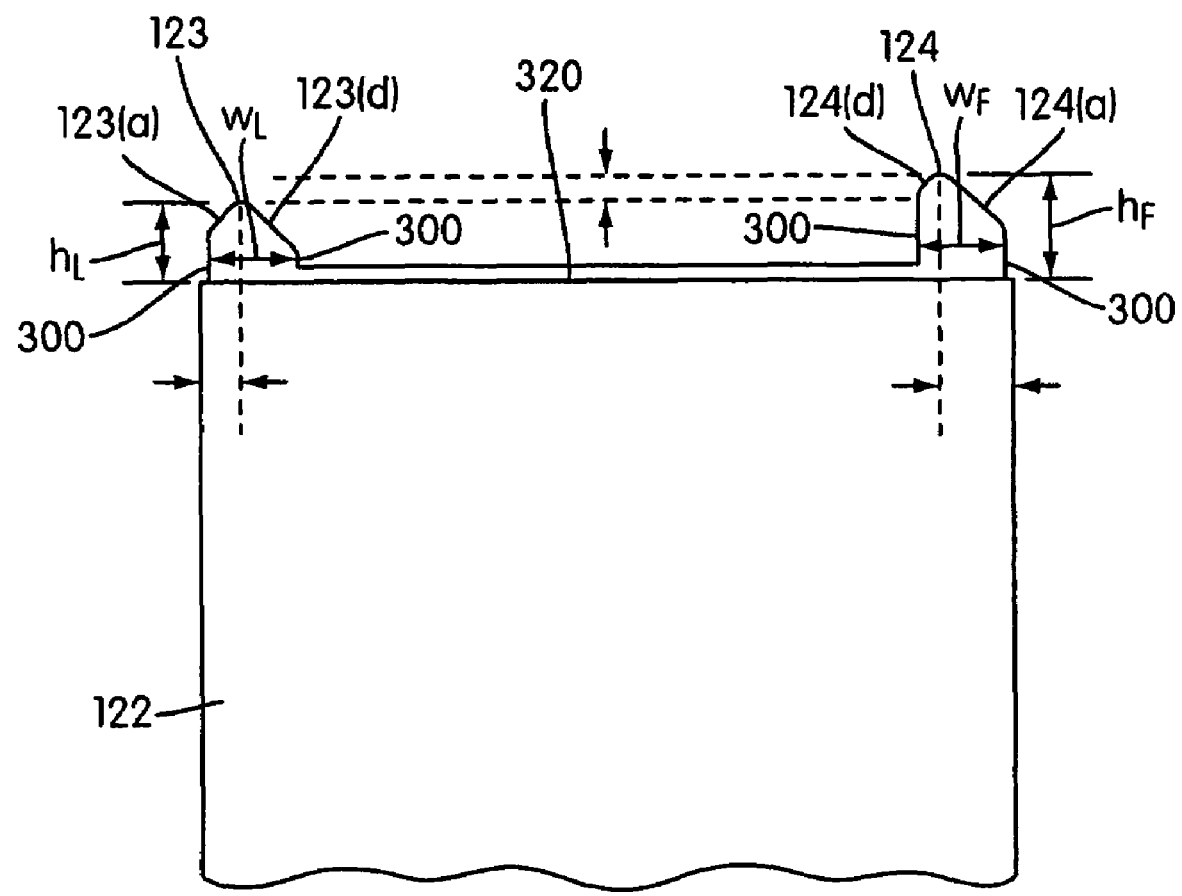
FIG. 12 is a front view of a cable connector component of a module.

FIG. 12 depicts a close up view of the connector 122, shown in FIG. 11, with an alternate embodiment for guideposts 123, 124. With reference to FIG. 12, posts 123 and 124 may be asymmetrical to allow for insertion of the cable connector 122 into the cable receptor 69 without requiring perfect alignment. The configuration of guideposts 123 and 124 account for tolerances in the connector 122 and cable receptor 69. The lead guidepost 123 is shorter than the follow guidepost 124 to allow for a rotational connection. In addition, each of the guideposts includes four generally vertical base sides 300, a plurality of angled surfaces 123a-123d, 124a-124d extending out from the vertical base sides 300, and a peak formed at the top of the angled side surfaces. Lead guidepost 123 has two longitudinal facing side angles 123a and 123d, and two lateral facing side angles 123b and 123c. Follow guidepost 124 includes two longitudinal side angles 124a and 124d, and two lateral facing side angles 124b and 124c.

The lateral facing side angles 123b, 124b and 123c, 124c may generally be positioned at the same angle and angled toward the center of the cable connector 122. In one embodiment, the lateral side angles 123b, 124b and 123c, 124c may be between 30° and 60° and in another alternate arrangement may be between 40° and 50°, with respect to the vertical side from which it extends. In one specific arrangement, the lateral side angles 123b and 123c of lead guidepost 123 may be 45° and the lateral side angles 124b and 124c of follow guidepost 124 may be 45°.

The longitudinal side angle 123a of lead guidepost 123 is angled toward the center of the cable connector 122. In one embodiment, the longitudinal side angle 123a of lead guidepost 123 may be between 30° and 60° and in another alternate arrangement may be between 40° and 50°, with respect to the vertical side from which it extends. For example, the lateral side angle 123a of lead guidepost 123 may be 45°.

The lateral side angle 123d of lead guidepost 123 may be angled away from the center of the cable connector 122, toward the outer edge of the connector 122. In one embodiment, the fourth side angle 123d of lead guidepost 123 may be between 30° and 60° and in another alternate arrangement may be between 40° and 50°, with respect to the vertical side from which it extends. For example, the longitudinal side angle 123d of lead guidepost 123 may be 45°.

The longitudinal side angle 124a of follow guidepost 124 is angled toward the center of the cable connector 122. In one embodiment, the first side angle 124a of follow guidepost 124 may be between 30° and 60° and in another alternate arrangement may be between 40° and 50°, with respect to the vertical side from which it extends. For example, the longitudinal side angle 124a of follow guidepost 124 may be 50°.

The longitudinal side angle 124d of follow guidepost 124 may be angled away from the center of the cable connector 122, toward the outer edge of the connector. In one embodiment, the longitudinal side angle 124d of follow guidepost 124 may be between 30° and 60° and in another alternate arrangement may be between 40° and 50°, with respect to the vertical side from which it extends. For example, the longitudinal side angle 124d of the follow guidepost 124 may be 45°.

With reference to FIG. 12, the asymmetry of the guideposts 123, 124 of cable connector 122 is visible. Asymmetry of guideposts 123 and 124 includes angled sides of varying degrees, in addition to a difference in the height of each guidepost. The displacement of lead guidepost 123 from the outer edge of the cable connector 122 may be less than that of follow guidepost 124. For example, the lead guidepost 123 may have an outer bevel in that the peak is located longitudinally outward of the guidepost centerline. Follow guidepost 124 may have an inner bevel in that the peak is located longitudinally inward of the guidepost centerline. In one embodiment, the displacement of lead guidepost 123 may be between 0.25 and 1.10 mm (0.010" to 0.043) and in an alternate arrangement may be between 0.60 and 0.90 mm (0.024" to 0.035"). For example, the displacement of the lead guidepost 123 may be 0.76 mm (0.030").

The displacement of follow guidepost 124 from the outer edge of cable connector 122 may be greater than that of lead guidepost 123. In one embodiment, the displacement of follow guidepost 124 may be 1.25 to 2.00 mm (0.049" to 0.079") and in an alternate arrangement may be between 1.4 to 1.7 mm (0.055" to 0.067"). For example, the displacement of follow guidepost 124 may be 1.55 mm (0.061").

With further reference to FIG. 12, the height, $h_L$ of the lead guidepost 123 may be less than the height, $h_F$ of follow guidepost 124. In one embodiment, the height of the lead guidepost 123 may be between 1.25 to 2.00 mm (0.049" to 0.079") and in an alternate arrangement may be between 1.43 and 1.73 mm (0.056" to 0.068"). The height of the follow guidepost may be between 1.75 and 2.50 mm (0.069" to 0.098") and in an alternate arrangement may be between 1.98 and 2.28 mm (0.078" and 0.090"). For example, the height of the lead guidepost may be 1.58 mm (0.062") and the height of the follow guidepost may be 2.13 mm (0.084"). The height difference may be between 0.50 and 1.25 mm (0.020" to 0.049"). In one example, the height difference may be 0.55 mm (0.022"). This height difference aids in the rotational insertion of cable connector 122 into cable receptor 69 by accounting for tolerances between the two components.

In addition, the width $w_L$ of lead guidepost 123 may be generally equal to the width $w_F$ of the follow guidepost 124. This width may aid in aligning the cable connector 122 for insertion into the cable receptor 69 and may ensure proper connections within the cable receptor 69.

Between guideposts 123 and 124 is recessed area 320. Recessed area 320 includes a plurality of electrical connections configured for coupling to a plurality of electrical connections within the cable receptor 69.

Figure 13A:
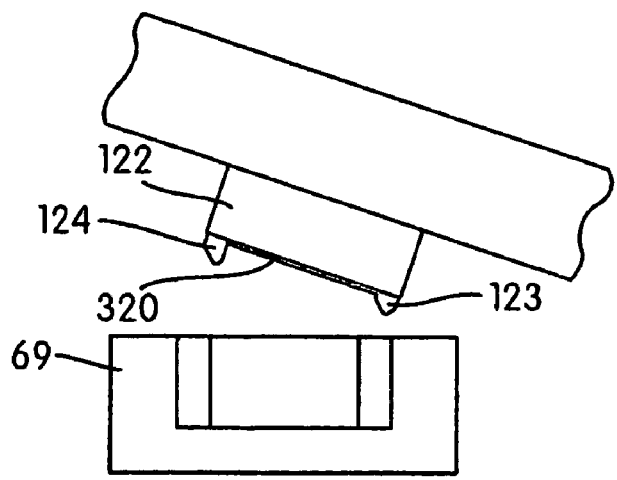
FIGS. 13A-13C are front views of a cable connector being rotationally inserted into a cable receptor at sequential states.
Figure 13B:
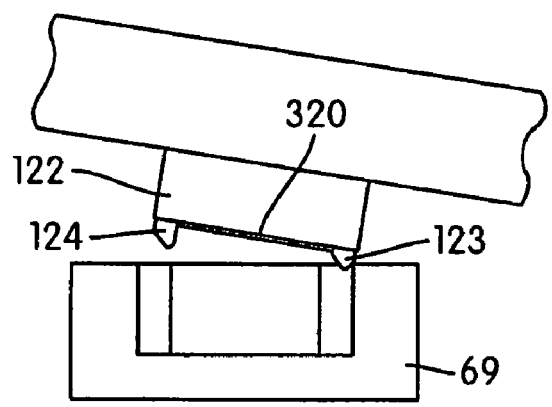
Figure 13C:
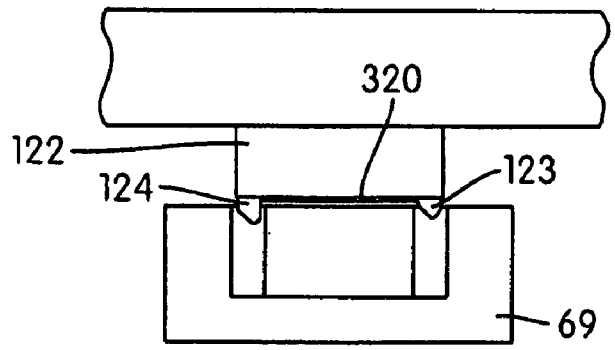

Thus, as shown in FIGS. 13A-13C, the cable connector 122 is configured for angled insertion into the cable receptor 69 and cable connector 122 can be rotatably mated to cable receptor 69. Cable receptor 69 may be configured to provide the necessary clearance and tolerance. FIGS. 13A through 13C depict the radial insertion of cable connector 122 into cable receptor 69 in sequential order. These figures illustrate the mating of the connectors not seen in FIG. 6. FIG. 13A shows the cable connector 122 as it approaches the cable receptor 69 for angled insertion. The details of the cable connector guideposts were discussed in FIG. 12. As illustrated in FIG. 13B, lead guidepost 123 may make contact before follow guidepost 124, as the cable connector 122 is rotated into position. The angled top of lead guidepost 123 may aid in positioning the cable connector 122 as it mates with cable receptor 69. The angled top and shorter height of lead guidepost 123 aid in accommodating tolerances between the two components. Follow guidepost 124 may further aid in alignment and final straightening as connector 122 comes in contact with cable receptor 69.

FIG. 13C depicts the cable connector 122 as it is mated to cable receptor 69. Lead guidepost 123 and follow guidepost 124 are seen contained within the cable receptor 69.

Alternatively, the cable connector 122 and the cable receptor 69 could be configured so as to require relatively straight insertion. In such a design, preferably either two sets of latches would be provided or an alignment guide would be provided along with at least one latch so that aligning the cable connector 122 with the cable receptor 69 would not be overly difficult.

Cable connector 122 includes a plurality of grounding tabs, or spring fingers, 125 that flex and contact the frame 210 when the frame 210 and the cable assembly 120 are assembled together. These grounding tabs allow for the cable connector 122 to be free floating within the housing. The free floating connector 122 may move to accommodate radial insertion of the housing into the base unit. In an exemplary embodiment, the grounding tabs 125 help to provide EMI grounding.

Figure 14:
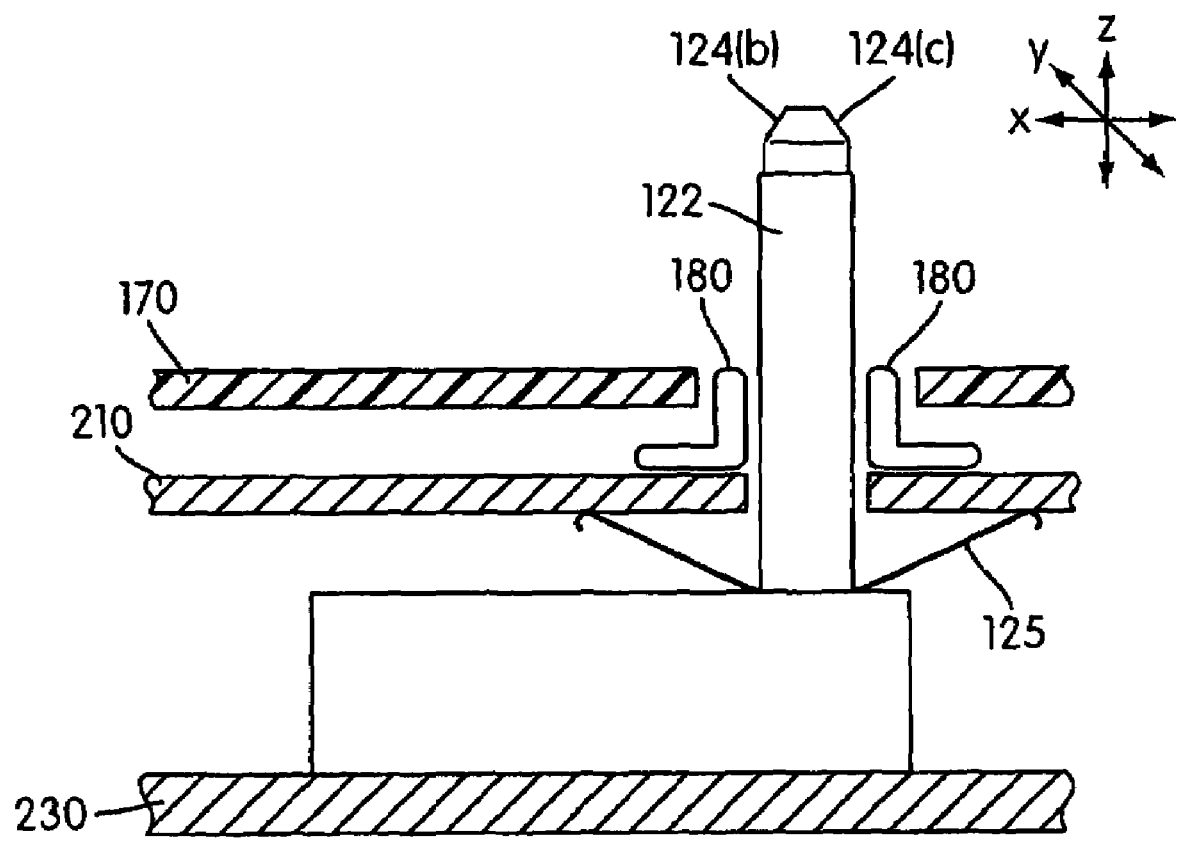
FIG. 14 is a side view of a cable connector assembly.

In another embodiment shown in FIG. 14, the spring fingers provide resistance to aid in positioning the cable connector 122. At rest, the spring fingers 125 are in a full open position. The height of this full open position may be between 10.0 and 14.0 mm. In one specific embodiment, the spring fingers extend to a height of 13.0 mm above the base of the cable connector 122. As the cable connector 122 is sandwiched between the mid-frame 230 and the frame 210 during assembly, the spring fingers 125 are compressed. In the compressed state, the spring fingers may extend to a height of 8.5-13.0 mm. In one specific embodiment, the spring fingers extend to a height of 11.5-12.0 mm in the compressed state. Such compression aids in maintaining the position of the cable connector 122 while allowing for additional movement or float of the cable connector 122. For instance, upon assembly, the cable connector 122 may freely float, or move with respect to the housing.

During insertion of the cable connector 122 into the cable receptacle 69, the spring fingers 125 may be further compressed to aid in positioning the cable connector 122. As the cable connector 122 is inserted into the cable receptacle 69, the cable connector 122 may move in a downward or vertical direction. The spring fingers 125 allow movement in this vertical direction, toward the bottom surface 170. In addition to allowing vertical movement, the spring fingers 125 also allow the cable connector 122 to tilt in any direction through a 360° lateral arc. The vertical and radial movement allowed by the spring fingers 125, is particularly useful when the HDD is rotated into the console 10.

Flexible seal 180 allows for movement in the longitudinal and lateral directions. In one arrangement, the connector 122 may move 2 mm in either direction, both longitudinally and laterally. To help protect the cable assembly 120, the seal 180 helps isolate the cable connector 120 from a side orientated shock event. The seal 180 prevents excessive lateral displacement in the event that the module is dropped.

Figure 15:
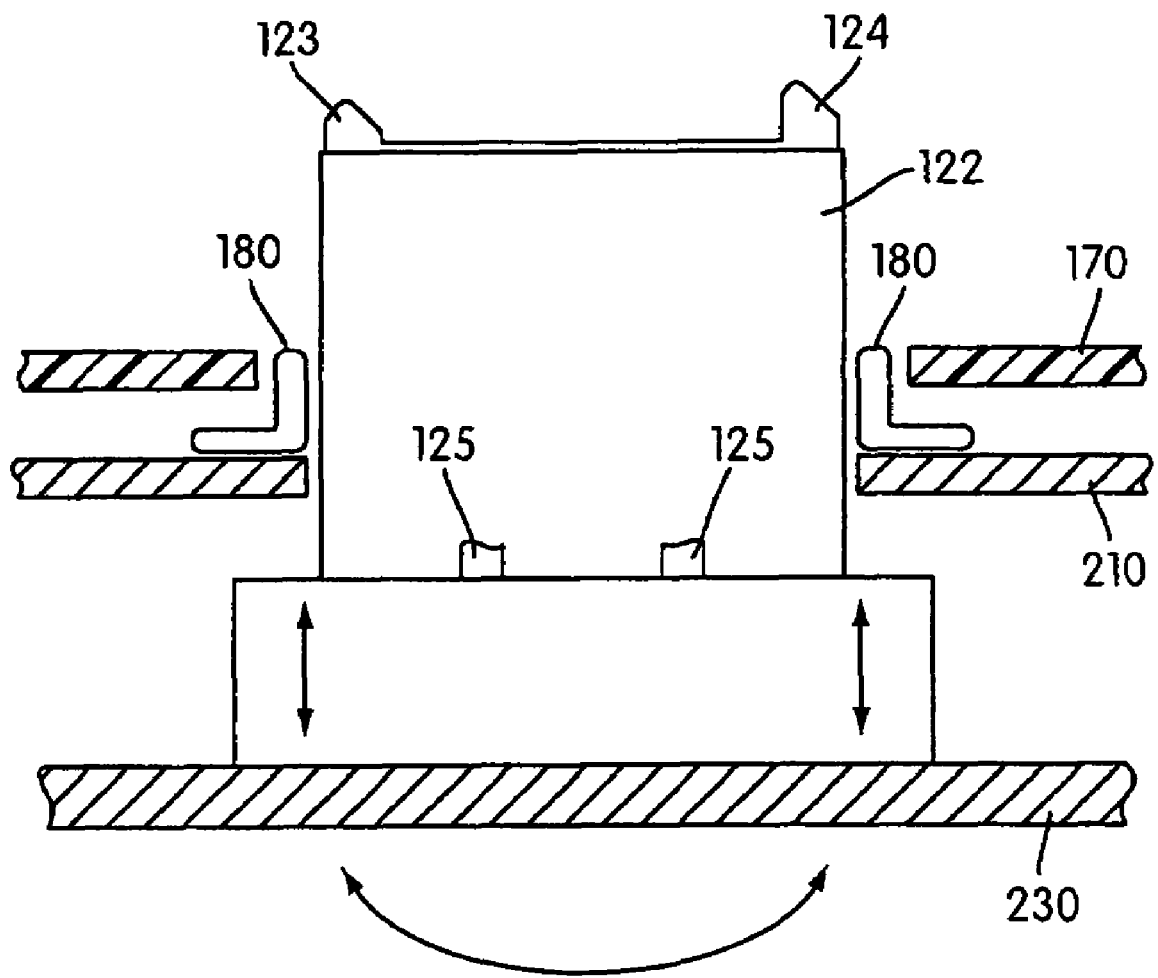
FIG. 15 is a front view of the cable connector assembly.

FIG. 15 illustrates the potential movement of the cable connector 122 in the z direction, due to the compression of the spring fingers. Either end of the connector 122 may flex into the housing, in the z direction, thereby forcing the other end of the connector 122 out of the housing. This z direction movement provides additional aid for rotational insertion. The spring fingers may have a reasonable compression amount that may be approximately 2 mm, before hitting a stopping point.

To aid in ensuring the cable is properly positioned, a ring 126 can be provided so that the space between the frame 210 and the midframe 230 is occupied. This aids in holding the cable connector 122 in place during installation of the HDD module 100.

Thus, according to an embodiment, a HDD module 100 can be inserted into a recessed surface 41 of a console 10 with a relatively simple rotational motion. The free floating connector 122, along with the spring fingers 125 and flexible seal 180, act as a guiding system to allow for radial insertion of the module into the base. The components of the guiding system work together to align the male portion of the connector 122 with the female portion of the receptor 69. In addition, they provide movement to account for tolerances between the two components that may normally prevent radial attachment. The same HDD module 100 can also be removed in a relatively simple manner by depressing a latch. Thus, an upgrade can be removably mounted to the console.

One basic principle of economics is that an individual will only pay for something that is perceived as having at least as much value, and preferably more value, than the cost. To provide the maximum value to the maximum number of individual, a console can be offered with standard capabilities. Additional features could then be offered as upgrades for individuals who found the value of the features exceeded the cost. According, a customizable console could maximize the value enjoyed by the greatest number of people. Naturally, the shape of the console or the upgrade can vary. It is beneficial, however, to provide a visual difference between the standard and an upgraded console.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A modular electronic storage unit configured for rotational attachment to a base unit comprising:
   a housing having a top and bottom wall;
   a connector extending through the bottom of the housing;
   a lead guide post positioned at a first longitudinal end of the electrical interconnect;
   a follow guide post positioned at a second longitudinal end of the electrical interconnect, the lead and follow guideposts being asymmetrical; and
   a recessed area having a plurality of electrical contacts between the lead and follow guideposts.

2. The modular electronic storage unit of claim 1, wherein the lead guidepost has a first angled top portion and the follow guidepost has a second angled top portion and wherein the first angled top portion includes an outer longitudinal side angle of 45° and the second angled top portion includes an outer longitudinal side angle of 50°.

3. The modular electronic storage unit of claim 1, wherein the height of the lead guide post is less than the height of the follow guide post.

4. The modular electronic storage unit of claim 3, wherein the lead and follow guideposts include vertical base sides and wherein the vertical base sides of the lead guidepost are shorter than the vertical base sides of the follow guidepost.

5. The modular electronic storage unit of claim 1, wherein the lead guidepost includes a peak that is positioned longitudinally outward of a guidepost centerline.

6. The modular electronic storage unit of claim 1, wherein the follow guide post includes a peak that is positioned longitudinally inward of a guidepost centerline.

7. The modular electronic storage unit of claim 1, further including a tongue, positioned at one longitudinal end of the storage unit and configured to engage with a portion of a base unit to enable rotational insertion of the storage unit into the base unit.

8. A modular electronic storage unit configured for rotational attachment to a base unit comprising:
   a housing having a top portion and a bottom portions;
   a connector extending through the housing and having
      a lead guide post positioned at a first longitudinal end of the connector and having a plurality of angled sides;
      a follow guide post positioned at an opposite longitudinal end of the electrical interconnect and having a plurality of angled sides different from the plurality of angled sides of the lead guide post;
      the height of the lead guidepost being shorter than the height of the follow guidepost; and
   a recessed area having a plurality of electrical contacts.

9. The modular electronic storage unit of claim 8 wherein the width of the lead guide post is the same as the width of the follow guide post.

10. The modular electronic storage unit of claim 8, wherein the inner longitudinal angle of the lead guide post is between 40° and 50°.

11. The modular electronic storage unit of claim 8 wherein the outer longitudinal angle of the lead guide post is between 40° and 50°.

12. The modular electronic storage unit of claim 8 wherein the inner longitudinal angle of the follow guide post is between 45° and 55°.

13. The modular electronic storage unit of claim 8, wherein the outer longitudinal angle of the follow guide post is between 40° and 50°.

14. The modular electronic storage unit of claim 8, wherein the displacement of the center of the lead guide post is less than the displacement of the center of the follow guide post.

15. A modular electronic storage unit configured for rotational attachment to a base unit comprising:
   a housing having a top portion and a bottom portion;
   a connector extending through the housing and having
      a lead guidepost positioned at a first longitudinal end of the connector and having a top portion including at least four main angled surfaces and a peak that is offset from a centerline of the lead guidepost; and
      a follow guide post positioned at a second longitudinal end of the connector and having a top portion including at least four main angled surfaces and a peak that is offset from a centerline of the follow guidepost.

16. The modular electronic storage unit of claim 15, wherein the offset of the peak of the lead guidepost from the exterior longitudinal edge of the lead guidepost is between 30% and 40% of the width of the lead guidepost, and the offset of the peak of the follow guidepost from the exterior longitudinal edge of the follow guidepost is between 70% and 80% of the width of the follow guidepost.

17. The modular electronic storage unit of claim 16, wherein the offset of the peak of the lead guidepost from the outer edge of the connector is between 0.60 and 0.90 mm.

18. The movable electrical interconnect of claim 16, wherein the offset of the peak of the follow guidepost from the outer edge of the connector is between 1.4 and 1.7 mm.

19. The modular electronic storage unit of claim 15, wherein the width of the lead guide post is equal to the width of the follow guide post.

20. The modular electronic storage unit of claim 15, wherein the lead guidepost and follow guidepost are asymmetrical and wherein the difference in height of the lead guidepost and follow guidepost is between 0.5 and 1.25 mm and wherein the offset of the peak of the lead guidepost is 38% of the width of the guidepost and the offset of the peak of the follow guidepost is 78% of the width of the guidepost.

* * * * *